US008838617B2

(12) United States Patent
Kim et al.

(10) Patent No.: US 8,838,617 B2
(45) Date of Patent: Sep. 16, 2014

(54) METHOD AND APPARATUS FOR SEARCHING FOR RECOMMENDED MUSIC USING EMOTIONAL INFORMATION OF MUSIC

(75) Inventors: Jung-Hyun Kim, Daejeon (KR); Seung-Jae Lee, Daejeon (KR); Sung-Min Kim, Daejeon (KR); Jee-Hyun Park, Daejeon (KR); Sang-Kwang Lee, Daejeon (KR); Yong-Seok Seo, Daejeon (KR); Jung-Ho Lee, Wonju-si (KR); Young-Suk Yoon, Daejeon (KR); Young-Ho Suh, Daejeon (KR); Won-Young Yoo, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 191 days.

(21) Appl. No.: 13/467,962

(22) Filed: May 9, 2012

(65) Prior Publication Data

US 2013/0138684 A1 May 30, 2013

(30) Foreign Application Priority Data

Nov. 28, 2011 (KR) .................. 10-2011-0125457

(51) Int. Cl.
*G06F 17/30* (2006.01)
(52) U.S. Cl.
USPC ........................................... 707/749
(58) Field of Classification Search
CPC .............. G06F 17/3074; G06F 17/30787
See application file for complete search history.

(56) References Cited

U.S. PATENT DOCUMENTS

| 2010/0145892 A1* | 6/2010 | Yang et al. ............... 706/12 |
| 2011/0035683 A1* | 2/2011 | Stead et al. .............. 715/753 |
| 2012/0233164 A1* | 9/2012 | Rowe et al. .............. 707/737 |

FOREIGN PATENT DOCUMENTS

| KR | 10-2007-0080299 A | 8/2007 |
| KR | 10-2009-0021041 A | 2/2009 |
| KR | 10-2010-0024769 A | 3/2010 |

OTHER PUBLICATIONS

Yang et al., "A Regression Approach to Music Emotion Recognition", 2007, pp. 1-10.*
Yang et al., "Mr. Emo: Music Retrieval in the Emotion Plane", 2008, MM08, Vancouver, Bristish Columbia, Canada, pp. 1003-1004.*

* cited by examiner

*Primary Examiner* — Hung Q Pham

(57) ABSTRACT

The present invention relates generally to a method and apparatus for searching for recommended music using the emotional information of music and, more particularly, to a method and apparatus that enable recommended music to be searched for using mixed emotions by extracting emotional values including a valence value and an arousal value from an input search condition when a predetermined search condition is input by a user, extracting an emotion rank combination corresponding to the extracted emotional value information using an emotion model that includes mixed emotions corresponding to the emotional values, searching a music emotion DB for music information corresponding to the emotion rank combination, and outputting a recommended music list based on the results of the search, thus improving the user's satisfaction with the results of the search.

18 Claims, 11 Drawing Sheets

METHOD AND APPARATUS FOR SEARCHING FOR RECOMMENDED MUSIC USING EMOTIONAL INFORMATION OF MUSIC

CROSS REFERENCE TO RELATED APPLICATION

This application claims the benefit of Korean Patent Application No. 10-2011-0125457, filed on Nov. 28, 2011, which is hereby incorporated by reference in its entirety into this application.

BACKGROUND OF THE INVENTION

1. Technical Field

The present invention relates generally to a method and apparatus for searching for recommended music using the emotional information of music. More particularly, the present invention relates to a method and apparatus that enable recommended music to be searched for using the emotional information of music by extracting emotional values including a valence value and an arousal value from an input search condition when a predetermined search condition is input by a user, searching a music emotion database using the emotional values, and outputting a recommended music list based on the results of the search.

2. Description of the Related Art

Recently, it has been possible to play music content on various types of devices such as smart phones, MP3 players, Personal Digital Assistants (PDA), computers, and digital audio equipment. The various types of devices have become widely dispersed, so that music files have also become popularized. Therefore, the number of music files personally held by a user is on a gradually increasing trend. Further, as the number of music files a user can personally access increases in geometrical progression, it becomes more and more important to obtain methods of efficiently finding the user's desired music files.

In a prior art, in order to search for and recommend music files, information about music genres or artists (musicians or singers) has been used. However, in order to use genre and artist information, there is the inconvenience of requiring information related to the preliminary classification of genres and artists and of having to be previously aware of the names of artists, the titles of songs sung by relevant artists, etc.

Further, technology for searching for and recommending music based on emotions or the atmosphere created by music (disclosed in Korean Unexamined Patent Application Publication No. 10-2010-0024769 entitled "Music recommendation system and method") has recently been presented. However, this technology is disadvantageous in that emotions felt by users while listening to music, or the atmosphere provided by music are subjective and vague, thus making it difficult to classify and express music as a single emotional type. Furthermore, such a conventional emotion-based music recommendation system has employed a scheme for recommending music corresponding to a relevant emotion if limited emotional keywords are selected one by one, or if a two-dimensional (2D) plane is divided into areas corresponding to respective emotions and then an emotion corresponding to a selected area is selected. As a result, this scheme cannot accurately provide a recommendation list with respect to a user's desired music.

That is, the prior art is problematic in that it is impossible to express or select mixed emotions felt in a single piece of music, and an interface is not intuitive, thus deteriorating the user's satisfaction with the results of the recommendations.

SUMMARY OF THE INVENTION

Accordingly, the present invention has been made keeping in mind the above problems occurring in the prior art, and an object of the present invention is to provide a method and apparatus for searching for recommended music, which enable music to be searched for using mixed emotions of music, thus increasing a user's satisfaction.

Another object of the present invention is to provide a method and apparatus for searching for recommended music, which can input search conditions for emotions in various formats from a user via an interface that can be conveniently used by the user, thus contributing to the convenience of the user.

In accordance with an aspect of the present invention to accomplish the above objects, there is provided a method for searching for recommended music using emotional information of music, the method being performed by a music search apparatus capable of searching for recommended music using the emotional information of music, including inputting a search condition required to search for recommended music, if the input search condition is music information, searching a music emotion database (DB), which stores information about emotional values including valence values and arousal values of respective pieces of music, for emotional value information corresponding to the input music information, if emotional value information corresponding to the input music information is not retrieved in the music emotion DB, searching for the emotional value information corresponding to the input music information using an Arousal Valence (AV) regressor, extracting a combination of emotion ranks corresponding to the retrieved emotional value information by using an emotion model that includes information about mixed emotions corresponding to valence values and arousal values, searching the music emotion DB for music information corresponding to the extracted emotion rank combination, and outputting a recommended music list including the retrieved music information.

In accordance with another aspect of the present invention to accomplish the above objects, there is provided an apparatus for searching for recommended music using emotional information of music, including an input interface unit for inputting a search condition required to search for recommended music, a music emotion database (DB) for storing information about emotional values including valence values and arousal values of respective pieces of music, an emotion model including information about mixed emotions corresponding to valence values and arousal values, an Arousal Valence (AV) regressor for searching for the emotional value information of the pieces of music, a control unit for searching the music emotion DB for emotional value information corresponding to input music information when the input search condition is music information, searching for emotional value information corresponding to the input music information using the AV regressor if emotional value information corresponding to the music information is not retrieved in the music emotion DB, and extracting a combination of emotion ranks corresponding to the retrieved emotional value information using the emotion model, a search unit for searching the music emotion DB for music information corresponding to the extracted emotion rank combination, and an output interface unit for outputting a recommended music list including the music information retrieved by the search unit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, preferred embodiments of the present invention will be described in detail with reference to the attached drawings.

Furthermore, although the embodiments of the present invention will be described in detail with reference to the attached drawings, the present invention is not limited or restricted by these embodiments.

Figure 1:
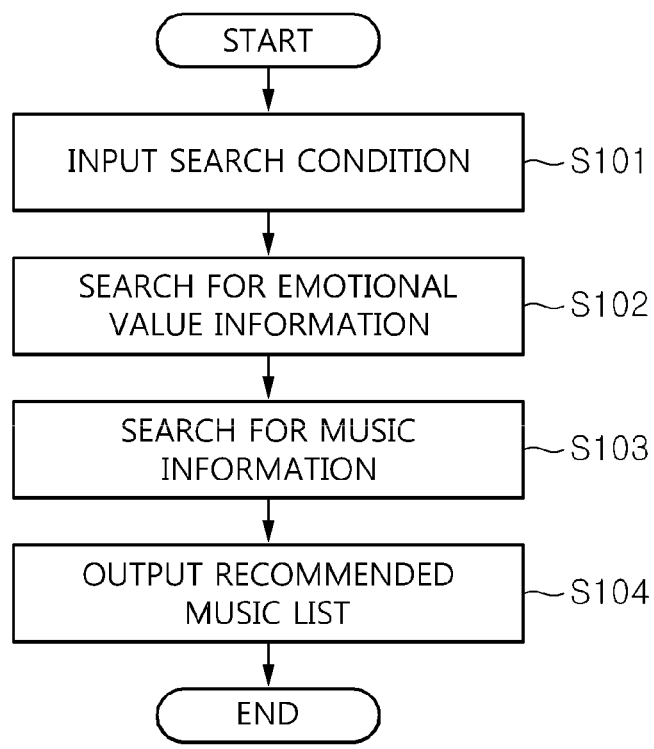
FIG. 1 is a flowchart showing a process for searching for recommended music according to an embodiment of the present invention.

FIG. 1 is a flowchart showing a process for searching for recommended music according to an embodiment of the present invention.

In accordance with the embodiment, a search condition required to search for recommended music is input at step S101. The search condition may include music information, emotional keywords, and emotional value information.

Next, when the input search condition is music information, emotional value information corresponding to the input music information is searched for in a music emotion database (DB) which stores information about emotional values including valence values and arousal values of respective pieces of music at step S102.

Further, when emotional value information corresponding to the input music information is not retrieved in the music emotion DB, the emotional value information corresponding to the input music information can be extracted (or generated) using an Arousal-Valence (AV) regressor.

Furthermore, a combination of emotional ranks corresponding to the retrieved emotional value information is extracted using an emotion model that includes information about mixed emotions corresponding to valence values and arousal values.

Next, music information corresponding to the extracted emotional rank combination is searched for in the music emotion DB which stores information about mixed emotions corresponding to respective pieces of music at step S104.

That is, using this procedure, music information corresponding to mixed emotions can be searched for.

Figure 2:
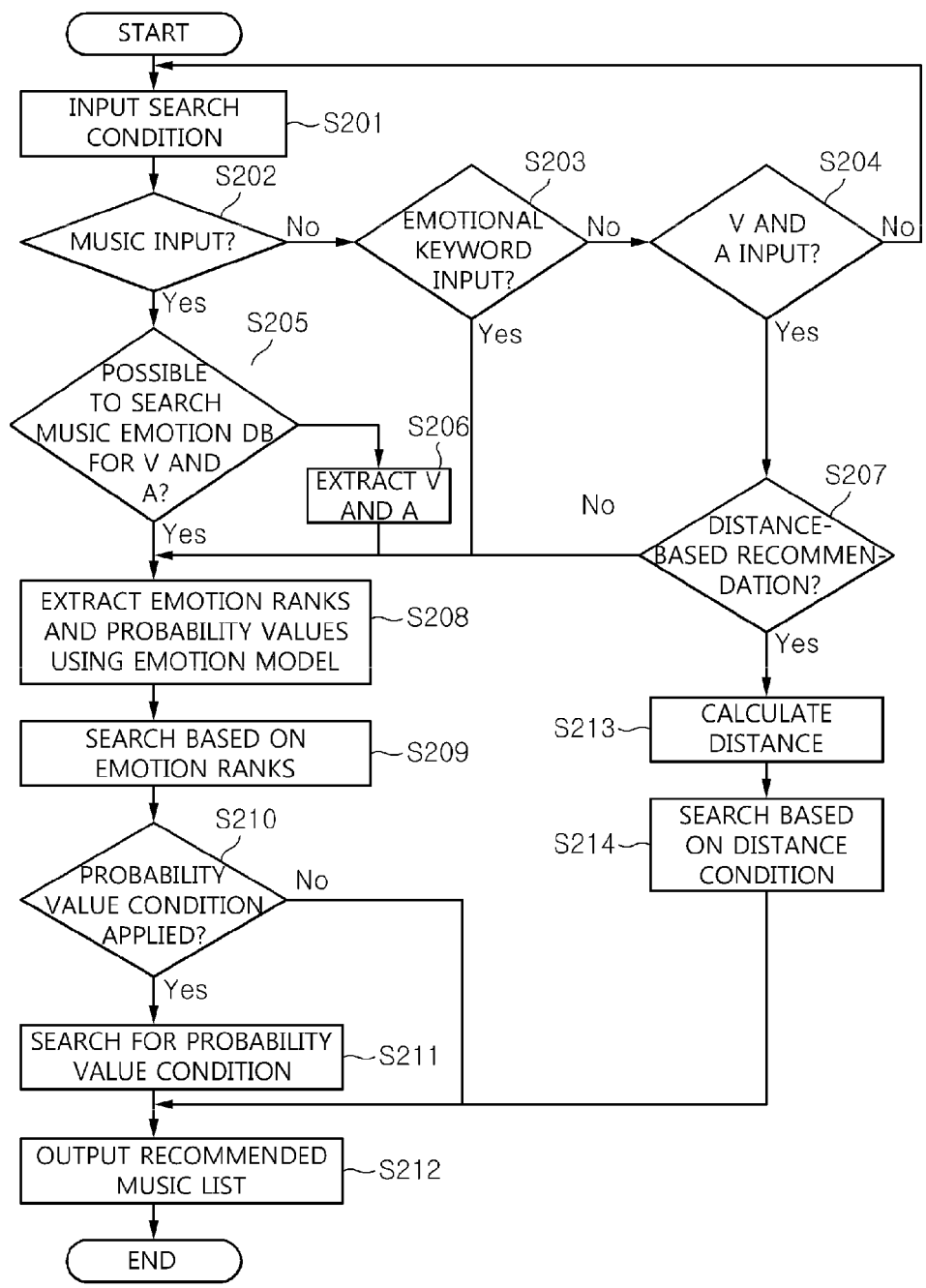
FIG. 2 is a flowchart showing a method for searching for recommended music using an emotional condition according to an embodiment of the present invention.

FIG. 2 is a flowchart showing a method of searching for recommended music using an emotional condition according to an embodiment of the present invention.

In accordance with the embodiment, a search condition required to search for recommended music is input at step S201.

Next, it is determined which type of search condition has been input as the input search condition.

That is, whether the input search condition is the input of music information is determined at step S202.

If it is determined at step S202 that the input search condition is music information, it is determined whether emotional value information corresponding to the input music information can be searched for in a music emotion DB which stores information about emotional values including valence values and arousal values of respective pieces of music at step S205.

If it is determined at step S205 that emotional value information corresponding to the input music information is not retrieved in the music emotion DB, the emotional value information corresponding to the input music information is extracted (or generated) using an AV regressor at step S206.

The AV regressor includes a module for extracting a V (valence: negative versus positive information) value and an A (Arousal: the degree of arousal) value from music.

Next, a combination of emotion ranks corresponding to the retrieved emotional value information is extracted using an emotion model that includes information about mixed emotions corresponding to valence values and arousal values at step S208.

As the emotion model, an emotion model disclosed in prior patent (Korean Patent Application No. 11-0053785) entitled "Apparatus and method for searching for music using emotion model" can be used.

Next, music information corresponding to the extracted emotion rank combination is searched for in the music emotion DB which stores information about mixed emotions corresponding to respective pieces of music at step S209.

Further, it is determined whether to perform a search by applying a probability value condition to the search in the recommended music search procedure at step S210.

If it is determined at step S210 that a probability value condition is not to be applied to the search, a recommended music list including music information retrieved during the search is output at step S212.

In contrast, if it is determined at step S210 that the probability value condition is to be applied to the search, a probability value condition corresponding to the retrieved emotional value information is extracted using the emotion model, and music information satisfying the probability value condition is searched for in the music information corresponding to the emotion rank combination at step S211, and a recommended music list including the retrieved music information is output at step S212.

The search using the emotion rank combination and the probability value condition will be described in detail later with reference to FIG. 4.

Further, if it is determined at step S202 that the input search condition is not music information, it is determined whether the input search condition is an emotional keyword at step S203.

If it is determined at step S203 that the input search condition is an emotional keyword, an emotion rank combination of emotions contained in the emotional keyword is extracted using the emotion model at step S208, and then the recommended music search process may be performed.

In contrast, if it is determined at step S203 that the input search condition is not an emotional keyword, it is determined whether the input search condition is emotional value information including a valence value and an arousal value at step S204.

If it is determined at step S204 that the input search condition is emotional value information including a valence value and an arousal value, it is determined whether to perform distance-based recommendation at step S207.

If it is determined at step S207 that distance-based recommendation is not to be performed, an emotion rank combination corresponding to the input emotional value information is extracted using the emotion model at step S208, and then the recommended music search process may be performed.

In contrast, if it is determined at step S207 that distance-based recommendation is to be performed, a two-dimensional (2D) plane having valence values and arousal values as values of respective axes is configured based on the emotional value information stored in the music emotion DB. Further, a range corresponding to a preset distance and a preset angle is calculated around predetermined coordinates corresponding to the input emotional value in the configured 2D plane at step S213, and music information falling within the range is searched for at step S214, and thus the recommended music search process may be performed.

The distance-based recommended music search will be described in detail later with reference to FIG. 6.

Figure 3:
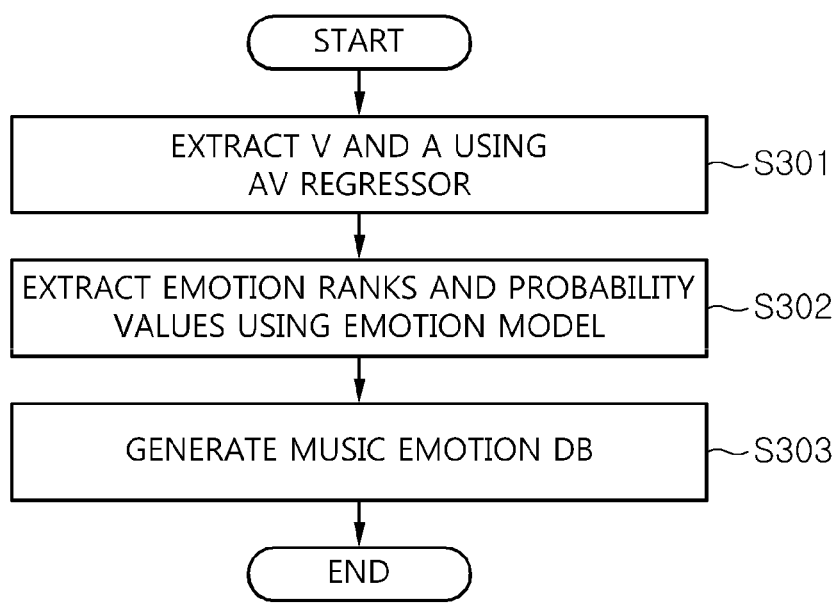
FIG. 3 is a flowchart showing a procedure for generating a music emotion database according to an embodiment of the present invention.

FIG. 3 is a diagram showing a procedure for generating a music emotion DB according to an embodiment of the present invention.

In accordance with the embodiment, when respective pieces of music are input via a predetermined input interface, valence values and arousal values are extracted from the pieces of music using an AV regressor at step S301.

Next, on the basis of the extracted valence values and arousal values, probability values for respective emotions (Pdf) and the ranks of the probability values (Rank) are extracted using the emotion model at step S302, and the pieces of extracted information are stored to generate the music emotion DB at step S303.

Further, the recommended music search according to the embodiment of the present invention can be performed using the generated music emotion DB.

Figure 4:
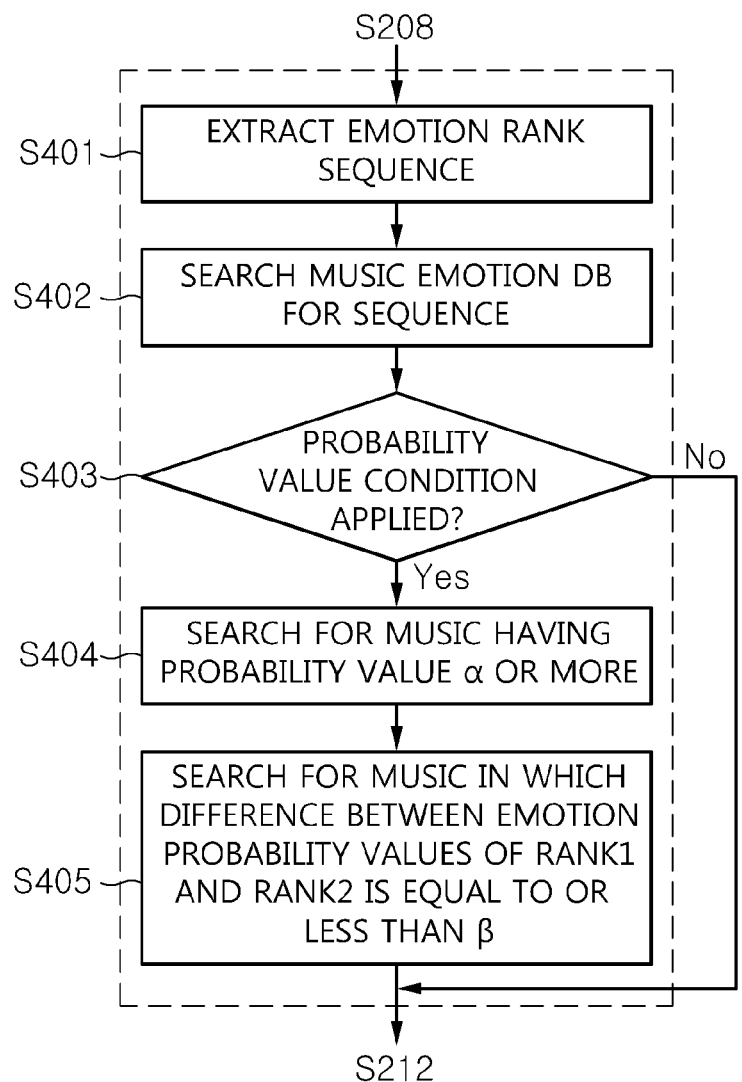
FIG. 4 is a flowchart showing in detail the music search procedure of FIG. 2.

FIG. 4 is a flowchart showing in detail the music search procedure of FIG. 2.

In accordance with the embodiment, a search for music information corresponding to an emotion rank combination enables a search using mixed emotions to be performed in such a way as to perform a search by combining the ranks of input emotions. Further, the number of inputtable emotions may vary with the number of classifiable emotions. That is, when the number of classifiable emotions is N, the maximum number of inputtable emotions may also be N.

Therefore, when m emotions are input by selecting upper m emotions from among the emotions of selected music or by selecting an emotional keyword, a sequence that can be output when m emotions are selected from among the m emotions, that is, a sequence of permutations P(m, m), is extracted at step S401, and pieces of music having an emotion rank identical to that of the extracted sequence are searched for in the music emotion DB at step S402.

That is, in accordance with the embodiment, when a piece of music is input, emotion ranks of the music s_Rank1, s_Rank2, ..., s_Rankn may be extracted, and a first rank emotion is s_Rank1, and thus music for which a first rank emotion Rank1 in the music emotion DB is identical to s_Rank1 is recommended. In this case, in order to search for music having very high similarity in emotion to the input music, pieces of music for which m (closer to n) emotion ranks are identical to those of the input music may be searched for in the music emotion DB because similarity between pieces of music becomes higher when as many emotion ranks as possible are identical to those of the input music.

Further, in accordance with the embodiment, when two emotional keywords mood1 and mood2 are input, songs having two emotions thereof as a first rank Rank1 and a second rank Rank2 can be searched for in the music emotion DB. That is, pieces of music for which rank values Rank1 and Rank2 are identical to the sequence of permutations P(2, 2):(mood1, mood2), (mood2, mood1) can be searched for in the music emotion DB.

Meanwhile, it is determined whether to apply a probability value condition to a search at step S403. If it is determined that the probability value condition is to be applied to the search, the condition of an emotion probability can be used to perform a more accurate search than a search based on ranks depending on the purpose of recommendation as well as emotion rank information.

That is, in the above embodiment, a condition in which the probability value of a first rank emotion is equal to or greater than a (minimum probability value a maximum probability value) is given at step S404, so that the results of the search which are uniform in general can be expected. Alternatively, a condition in which a difference between a first rank emotion and a second rank emotion is equal to or less than β (Pdf of Rank1−Pdf of Rank2) is given at step S405, so that the results of the search in which the first rank emotion is dominantly higher, or first and second rank emotions are dominant in a similar degree can be obtained.

Figure 5:
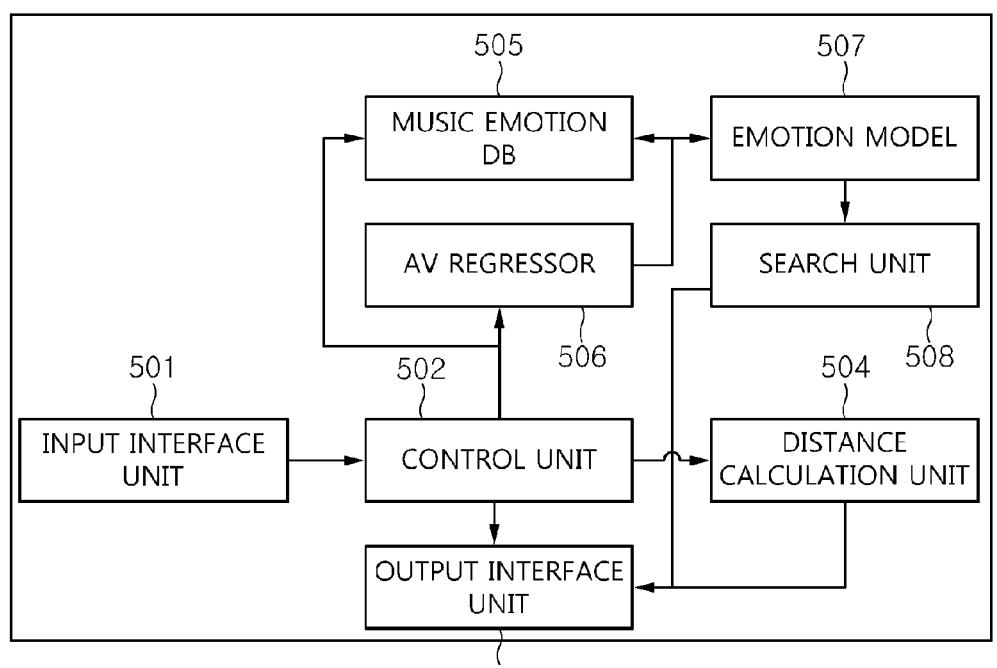
FIG. 5 is a diagram showing the configuration of an apparatus for searching for recommended music according to an embodiment of the present invention.

FIG. 5 is a diagram showing the configuration of an apparatus for searching for recommended music according to an embodiment of the present invention.

In accordance with an embodiment, the recommended music search apparatus may include an input interface unit 501, a music emotion DB 505, an emotion model 507, an AV regressor 506, a control unit 502, a search unit 508, a distance calculation unit 504, and an output interface unit 503. The input interface unit 501 inputs a search condition required to search for recommended music. The music emotion DB 505 stores information about emotional values including valence values and arousal values of respective pieces of music. The emotion model 507 includes information about mixed emotions corresponding to valence values and arousal values. The AV regressor 506 extracts (or generates) the emotional value information of the pieces of music. The control unit 502 searches the music emotion DB for emotional value information corresponding to input music information when the input search condition is music information, extracts (or generates) the emotional value information corresponding to the input music information using the AV regressor if emotional value information corresponding to the music information is not retrieved in the music emotion DB, and extracts an emotion rank combination corresponding to the retrieved emotional value information using the emotion model. The search unit 508 searches the music emotion DB for music information corresponding to the extracted emotion rank combination. The distance calculation unit 504 calculates a distance required to search for recommended music. The output interface unit 503 outputs a recommended music list including music information retrieved by the search unit.

The control unit 502 may extract a probability value condition corresponding to the retrieved emotional value information using the emotion model, and the search unit 508 may search music information corresponding to the emotion rank combination for music information satisfying the probability value condition.

Further, the control unit 502 may extract the distribution of emotion ranks and emotion probability values corresponding to the input emotional value information by using the emotion model when the input search condition is emotional value information including a valence value and an arousal value.

Furthermore, the control unit 502 may configure a 2D plane having valence values and arousal values as values of respective axes on the basis of the emotional value information stored in the music emotion DB when the input search condition is emotional value information including a valence value and an arousal value, and when a distance-based search is set to be performed. The search unit 508 may search for music information falling within a range corresponding to a preset distance and a preset angle around predetermined coordinates corresponding to the input emotional value in the configured 2D plane by utilizing the distance calculation unit 504.

Furthermore, the control unit 502 may extract an emotion rank combination of emotions contained in an emotional keyword when the input search condition is the emotional keyword.

The output interface unit 503 may output a user interface including a music play information box having a title information item of music currently being played, a search information input box, and a recommended music list output box. When the title information item is entered into the search information input box in the output user interface, the input interface unit 501 may recognize that music information about music currently being played has been input as a search condition.

Furthermore, the output interface unit 503 may output a user interface that includes an emotional value selection box implemented as a 2D plane that has valence values and arousal values as values of respective axes and that is divided into cells constituting a grid of a predetermined size, and a recommended music list output box. When a selection signal corresponding to any one of the cells of the grid is received, the input interface unit 501 may recognize that a valence value and an arousal value of the cell corresponding to the received selection signal have been input as emotional value information.

Furthermore, the output interface unit 503 may search the music emotion DB for the number of pieces of music corresponding to valence values and arousal values corresponding to the locations of the cells constituting the grid of the predetermined size, and may output the respective cells in different colors depending on the retrieved number of pieces of music.

Furthermore, the output interface unit 503 may output a user interface including an emotion list output box having a plurality of emotion-expressing words, a search information input box, and a recommended music list output box. When a predetermined emotion-expressing word included in the emotion list output box is input, the input interface unit 501 may recognize that an emotional keyword containing the input predetermined emotion-expressing word has been input as the search condition.

Furthermore, the output interface unit 503 may generate theme information containing a plurality of emotion-expressing words and output a theme information box when a plurality of emotion-expressing words are input from among the emotion-expressing words included in the emotion list output box. The input interface unit 501 may recognize that the emotional keyword containing the plurality of emotion-expressing words has been input as the search condition.

The output of the user interface will be described in detail with reference to FIGS. 8 to 11.

Figure 6:
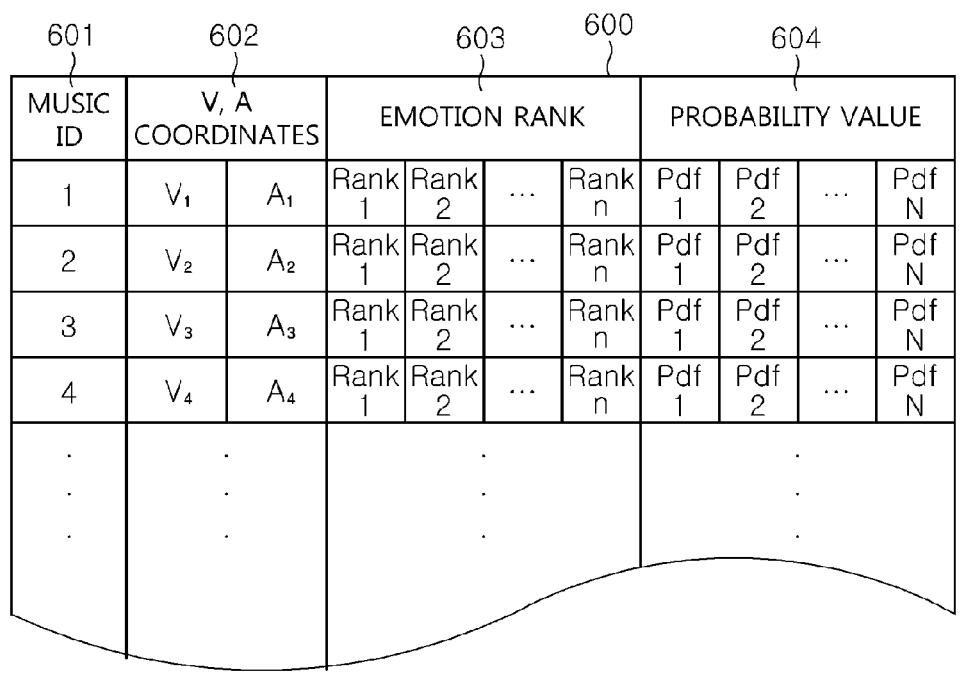
FIG. 6 is a diagram showing a music emotion database according to an embodiment of the present invention.

FIG. 6 is a diagram showing the music emotion DB according to an embodiment of the present invention.

In accordance with the embodiment, the music emotion DB may store information about emotional values including valence values and arousal values of respective pieces of music.

That is, referring to FIG. 6, the music emotion DB may store music identification (ID) 601 enabling each piece of music to be identified, and also store coordinate information 602 related to valence values and arousal values of respective pieces of music. Further, from the valence values and the arousal values, probability values for respective emotions (Pdf) and the ranks of the probability values (Rank) may be extracted using the emotion model, and may be stored in the music emotion DB.

Figure 7:
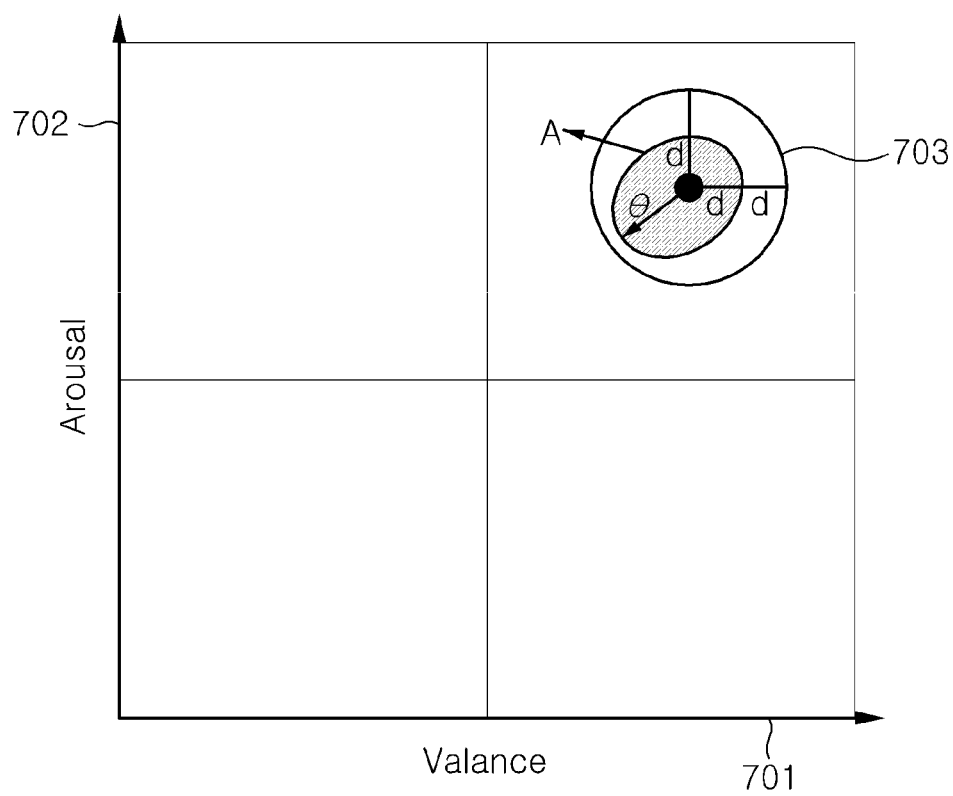
FIG. 7 is a diagram showing a distance-based conditional search according to an embodiment of the present invention.

FIG. 7 is a diagram showing a distance-based conditional search according to an embodiment of the present invention.

In accordance with the embodiment, the method for searching for recommended music according to the embodiment of the present invention may recommend pieces of music based on a distance.

That is, when emotional value information including a valence value and an arousal value is input as a search condition, and the search apparatus of the invention is set to perform a distance-based search, a 2D plane having valence values 701 and arousal values 702 as values of respective axes is configured using emotional value information stored in a music emotion DB. Music information falling within a range 703 corresponding to a preset distance and a preset angle, around predetermined coordinates corresponding to the input emotional value information, can be searched for in the configured 2D plane.

That is, songs included in an area spaced apart from any coordinates in the 2D plane by a distance d and an angle θ can be recommended. Further, the distance d may be adjusted according to the total number of songs included in the music emotion DB or the number of songs distributed in each area of the 2D plane. Further, it is possible to recommend songs in the light of the characteristics of the user by designating a search area in such a way as to adjust the value of the angle θ depending on the user's emotional musical tendencies, as shown in 'A' in FIG. 7.

Figure 8:
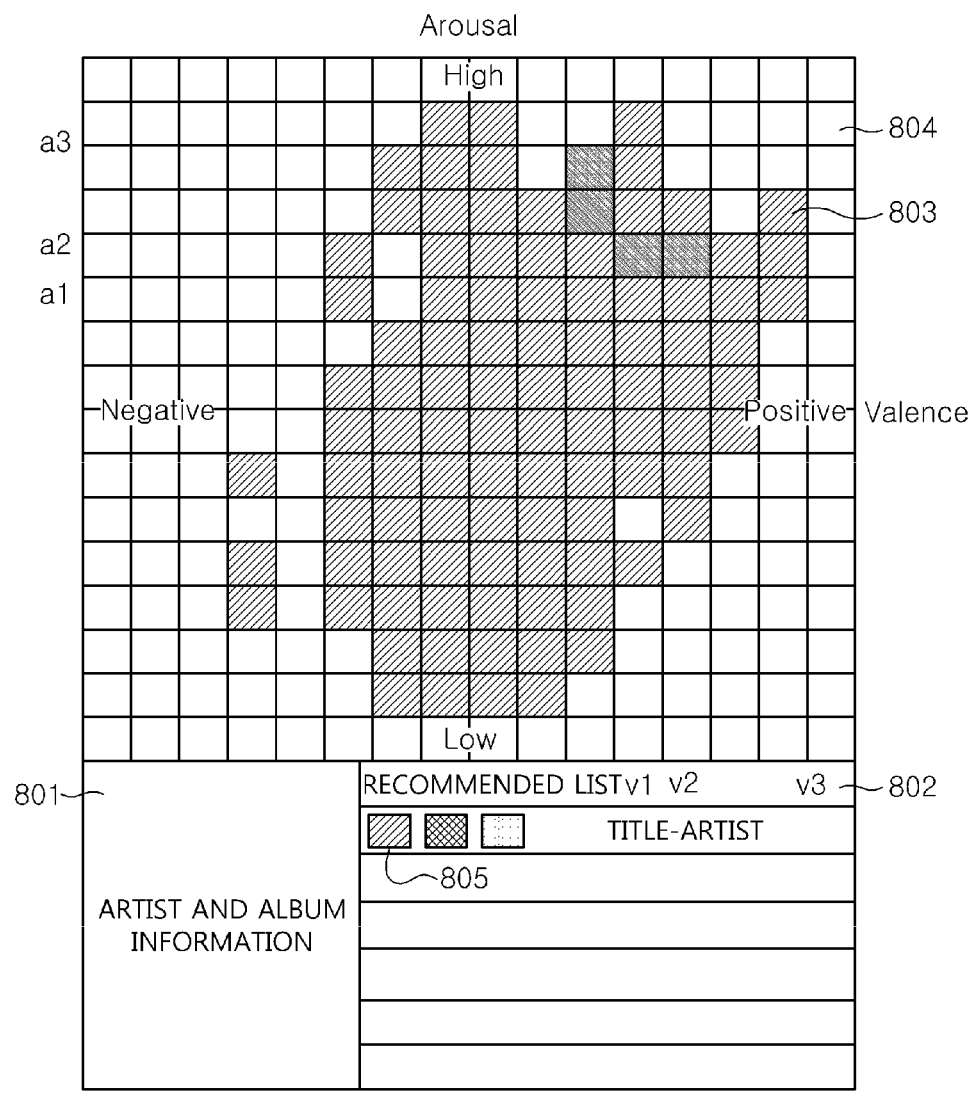
FIG. 8 is a diagram showing a user interface for inputting emotional values according to an embodiment of the present invention.

FIG. 8 is a diagram showing a user interface required to input emotional values according to an embodiment of the present invention.

The method for searching for recommended music according to an embodiment of the present invention may output a user interface including an emotional value selection box 804, implemented as a 2D plane that has valence values and arousal values as values of respective axes and that is divided into cells constituting a grid of a predetermined size, and a recommended music list output box 802.

Further, the recommended music search method according to the embodiment of the present invention is configured such that when a selection signal corresponding to any one of the cells is received using a predetermined cursor movement or touch operation, it is recognized that the valence value and the arousal value of the cell corresponding to the received selection signal have been input as the emotional value information and then the recommended music search process can be performed. Further, a recommended music list may be output via the recommended music list output box 802.

Furthermore, the recommended music search method according to the embodiment of the present invention is configured such that when any one piece of music is selected from among pieces of recommended music included in the recommended music list output box 802 using a predetermined cursor movement operation or a predetermined touch operation, information corresponding to the selected music can be output via the music information box 801. The corresponding information may include information about the artist of relevant music and an album related to the music. Furthermore, the recommended music list output box 802 may include a representative emotion icon 805 capable of indicating the emotions of pieces of recommended music included in the recommended music list.

Further, the size of the grid may be designated to be 8×8, 10×10, or 16×16. When a cell constituting part of the grid is clicked or when the cell is selected using an operation such as a touch or a drag, recommended music distributed in the area of the cell may be searched for, or, alternatively, recommended music may be searched for using information about the distribution of the emotion probabilities of the cell area.

Furthermore, the recommended music search method according to the embodiment of the present invention may be configured such that the number of pieces of music corresponding to valence values and arousal values corresponding to the locations of the respective cells constituting the grid of a predetermined size is searched for in the music emotion DB, and the respective cells may be output in different colors depending on the number of pieces of music retrieved during the search. That is, the color of the cell 803 having a larger number of pieces of music may be output in a dark color.

That is, the coordinate values of the emotional values of pieces of music held by the user are separately represented in colors different from that of a background in the 2D plane, thus enabling the emotional distributions of the music held by the user to be known.

Furthermore, in accordance with an embodiment, when the user selects a specific cell, the selected cell may be highlighted.

Furthermore, the recommended music search method according to the embodiment of the present invention may be configured such that when any one of pieces of recommended music included in the recommended music list output box 802 is selected, information corresponding to the selected music may be output via the music information box 801. The corresponding information may include the artist information of the music and album information related to the music. Further, the recommended music list output box 802 may include a representative emotion icon 805 capable of indicating the emotions of pieces of recommended music included in the recommended music list.

That is, emotions that rank higher for respective songs in the recommended list are indicated by icons or in colors, thus enabling the emotions of the songs to be intuitively known just from the list.

Figure 9:
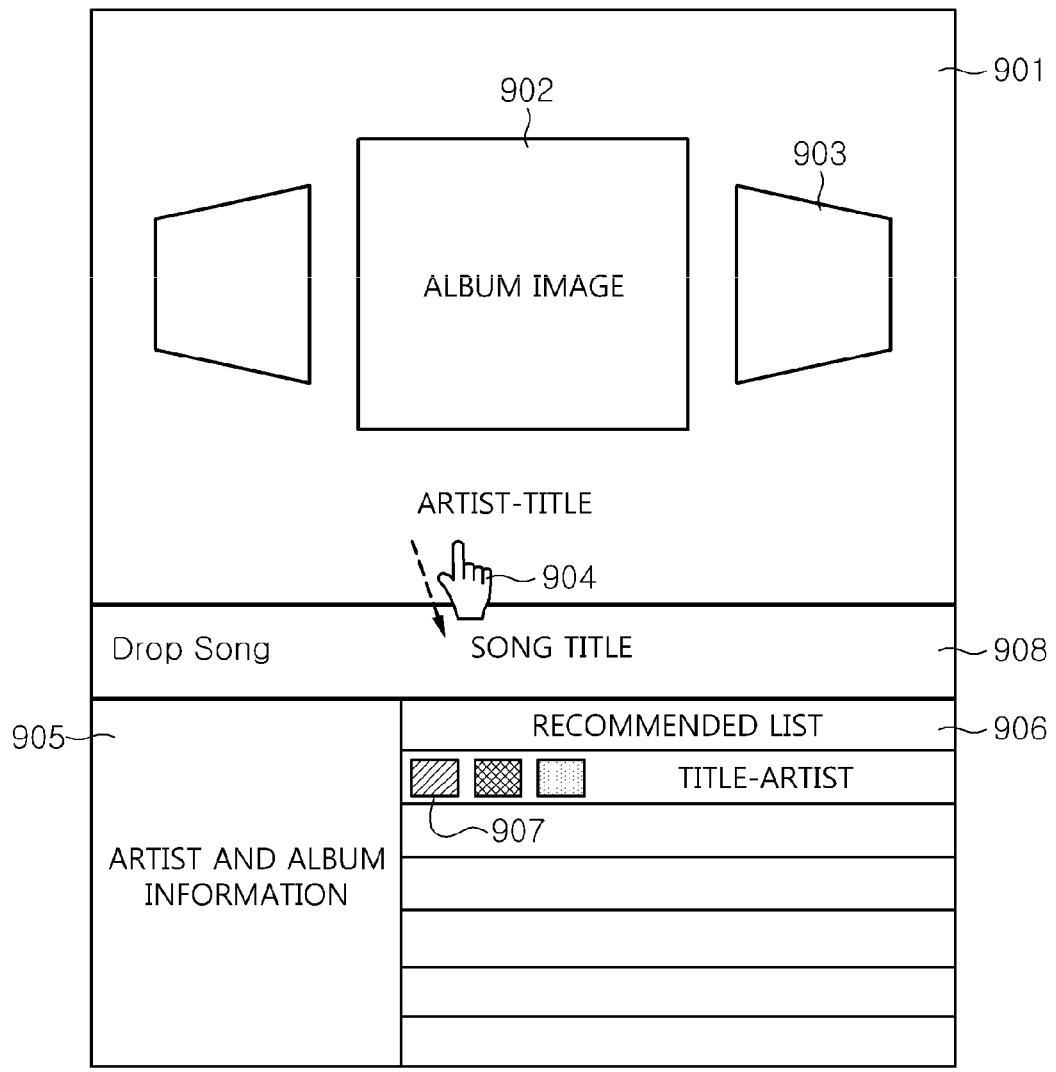
FIG. 9 is a diagram showing a user interface for inputting music according to an embodiment of the present invention.

FIG. 9 is a diagram showing a user interface for inputting music according to an embodiment of the present invention.

The recommended music search method according to the embodiment of the present invention may output a user interface including a music play information box 901 having a title information item of music currently being played, a search information input box 908, and a recommended music list output box 906.

The music title information item may include an artist item for music and a music title item for the music.

Furthermore, the recommended music search method according to an embodiment of the present invention is configured such that when a predetermined music title information item included in the music play information box 901 is input to the search information input box 908 using an input operation, such as a drag-and-drop operation based on a predetermined cursor movement or touch operation 904, it can be recognized that music information corresponding to the input music title information item has been input as the search condition.

Furthermore, the music play information box 901 may include album image and title information 902 of music currently being played, and an album image 903 of music to be subsequently played. When a music title is input to the search information input box 908 using an input operation, such as a drag-and-drop operation based on a predetermined cursor movement or touch operation 904, it can be recognized that music information corresponding to the input music title has been input as the search condition.

Furthermore, the recommended music search method according to the embodiment of the present invention is configured such that when any one of the pieces of recommended music included in the recommended music list output box 906 is selected, information about the selected music may be output via the music information box 905. The corresponding information may include the artist information of the music, and album information related to the music. Furthermore, the recommended music list output box 906 may include a representative emotion icon 907 capable of indicating the emotions of pieces of recommended music included in a recommended music list.

That is, in accordance with the embodiment, when the user desires to find pieces of music similar to music currently being played while listening to the music, or to find pieces of music similar to music present in a playlist, a recommended music list consisting of pieces of music having emotions similar to that of the music, selected by the user, may be provided to the user. That is, pieces of music, the emotion ranks of which are identical to that of the user, may be recommended, or pieces of music, the emotion probability values of which are similar to that of the user within a predetermined range, may be recommended by using the emotion ranks or emotion probability values of pieces of music.

Figure 10:
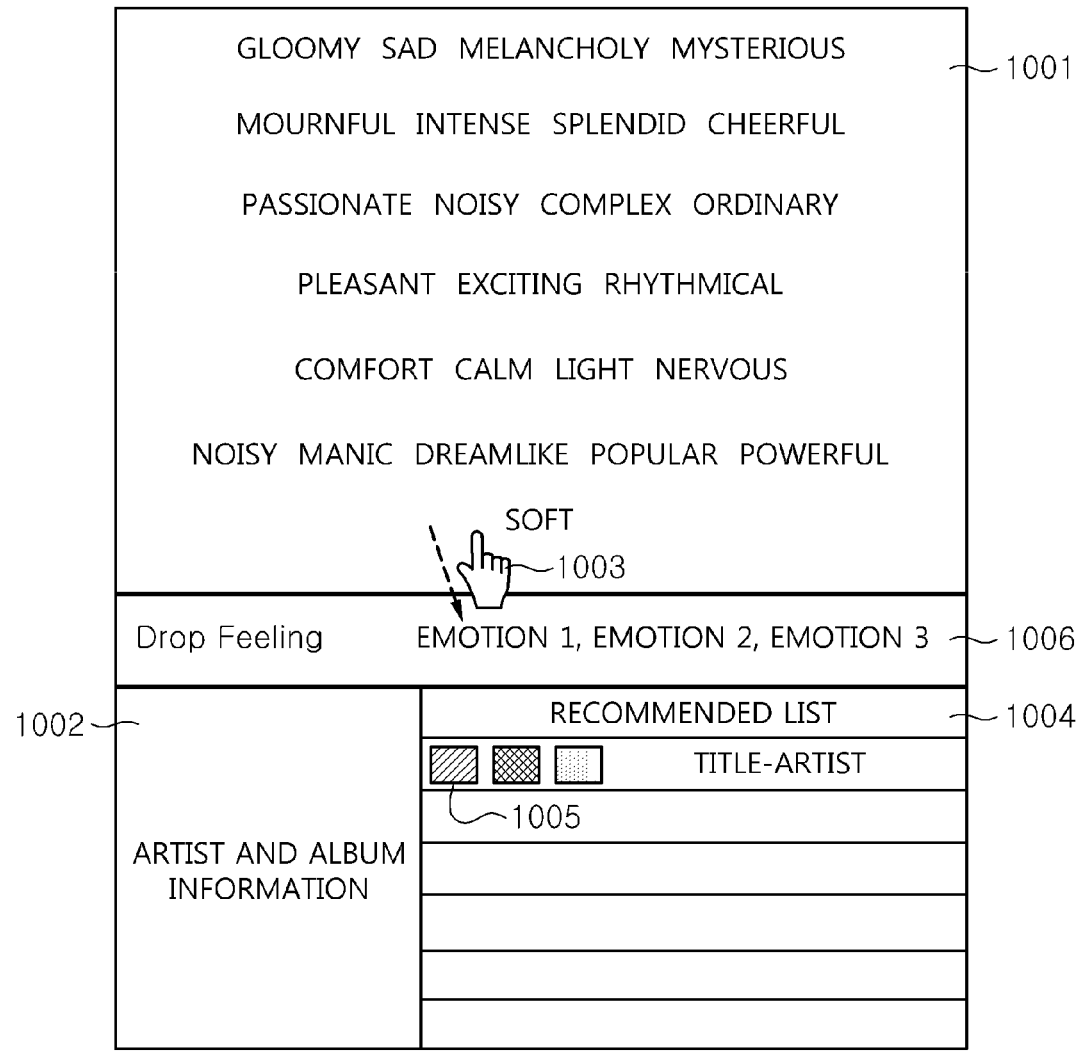
FIG. 10 is a diagram showing a user interface for inputting an emotional keyword according to an embodiment of the present invention.

FIG. 10 is a diagram showing a user interface for inputting an emotional keyword according to an embodiment of the present invention.

The method for searching for recommended music according to an embodiment of present invention may output a user interface including an emotion list output box 1001 including a plurality of emotion-expressing words, a search information input box 1006, a music information box, and a recommended music list output box 1004.

Emotions corresponding to predetermined music may be represented by emotion-expressing words that represent individual classified emotions, and these emotion-expressing words may be provided in the form of a tag cloud, an icon or a list. FIG. 10 illustrates an example in which emotion-expressing words are represented in the form of a tag cloud, wherein the sizes of respective emotion-expressing words may vary depending on the distribution of the emotions of pieces of music held by the user. As shown in FIG. 10, the sizes of words, for example, "pleasant" and "exciting" are represented as being bigger than other words, so that information indicating that the user has a relatively large number of pieces of music exhibiting a pleasant and exciting mood can be provided to the user via the screen of the user interface.

Further, the recommended music search method according to the embodiment of the present invention is configured such that when a predetermined emotion-expressing word included in the emotion list output box 1001 is input to the search information input box 1006 using an input operation, such as a drag-and-drop operation based on a predetermined cursor movement or touch operation 1003, it can be recognized that an emotional keyword including the input emotion-expressing word has been input as a search condition.

That is, songs that have an emotion represented by the selected emotion-expressing word as being either their first or second rank are searched for, and then retrieved songs can be output via the recommended list output box 1004.

Furthermore, since the emotions of music may vary with time or may be felt slightly differently by persons, emotion-expressing words may be combined to select mixed emotions so that emotional changes or the diversity of emotions can be expressed. That is, as shown in FIG. 10, when a plurality of words are input to the search information input box 1006, words corresponding to relevant emotions are simultaneously selected. For example, when the user desires to listen to a song which exhibits a cheerful, mysterious and calm mood, recommended music is searched for by combining the words "cheerful," "mysterious" and "calm." That is, pieces of music, for which the distribution of those three types of emotions, among the emotion probability values of music, is high, are searched for, and then retrieved music can be output via the recommended list output box 1004. The recommended music list output box 1004 may include a representative emotion icon 1005 capable of indicating the emotions of pieces of recommended music included in the recommended music list.

Furthermore, the recommended music search method according to the embodiment of the present invention is configured such that when any one of pieces of recommended music included in the recommended music list output box 1004 is selected, information corresponding to the selected music can be output via the music information box 1002. The corresponding information may include the artist information of the music and album information related to the music.

Figure 11:
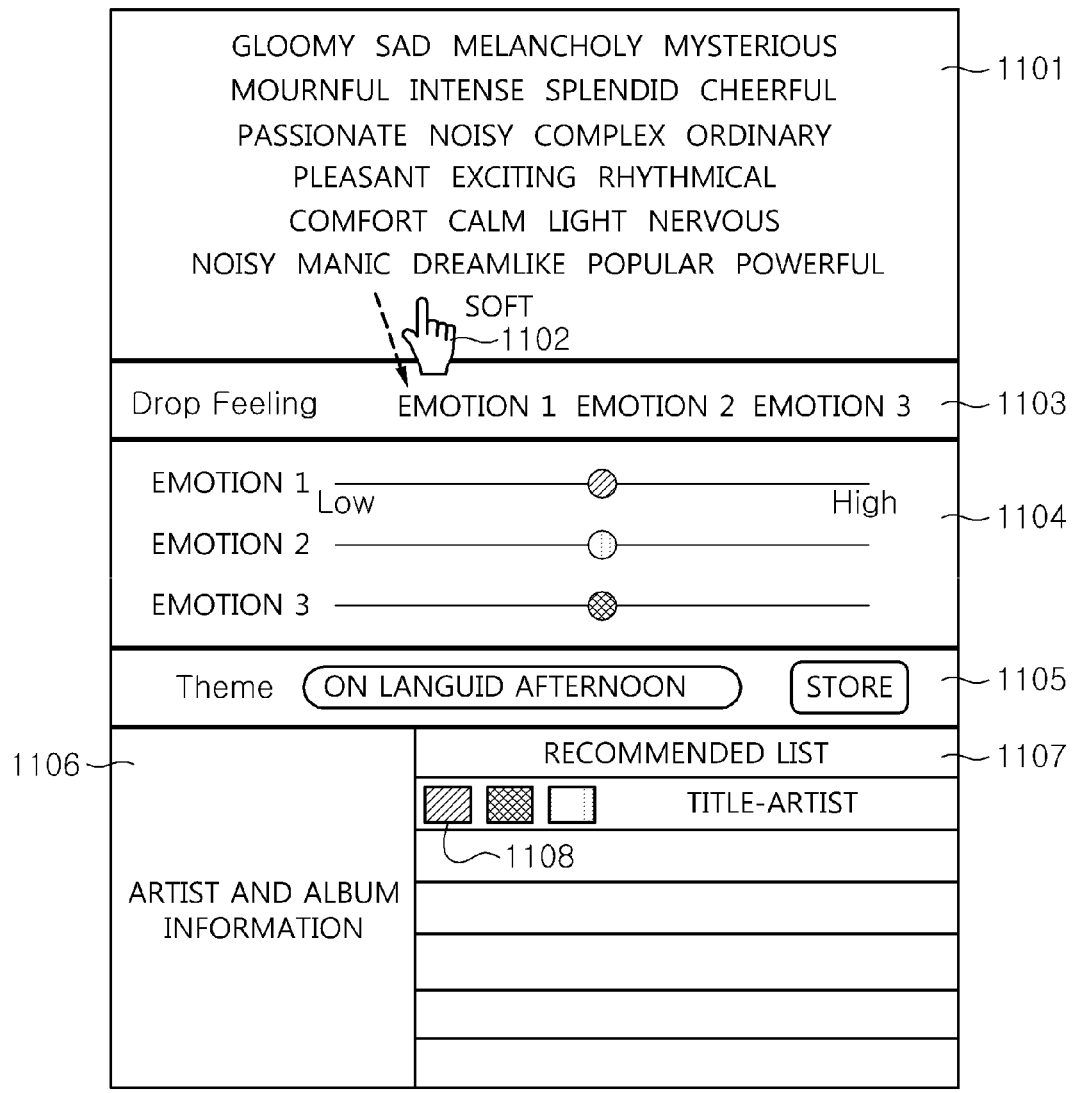
FIG. 11 is a diagram showing a user interface for inputting a theme according to an embodiment of the present invention.

FIG. 11 is a diagram showing a user interface for inputting a theme according to an embodiment of the present invention.

Themes represent situations formed by combinations of times, places, events, etc., and may be configured in a combination of a plurality of emotions. Therefore, theme-based music recommendation may be performed such that moods appropriate for relevant situations, that is, emotions felt in the situations, and songs appropriate for the emotions felt in the situations may be recommended. Further, similarly to the emotions of music, since emotions felt in the same situation may differ for persons, preferred music that match themes may also differ for persons.

Therefore, in accordance with the embodiment of the present invention, an interface for generating themes using the input of the user and finding music matching the generated themes can be provided. That is, the user can personally generate themes using an emotion combination function, and may configure a recommended music list including pieces of music matching the generated themes.

That is, referring to FIG. 11, the recommended music search method according to the embodiment of the present invention may output a user interface that includes an emotion list output box 1101 including a plurality of emotion-expressing words, a search information input box 1103, and a recommended music list output box 1107.

Further, the recommended music search method according to the embodiment of the present invention is configured such that when a plurality of emotion-expressing words among emotion-expressing words included in the emotion list output box 1101 are input to the search information input box 1103 using an input operation, such as a drag-and-drop operation based on a predetermined cursor movement or touch operation 1102, theme information including the plurality of emotion-expressing words is generated, both a theme information box 1104 including the theme information and a theme storage menu 1105 are output, and it can be recognized that an emotional keyword including the plurality of emotion-expressing words has been input as a search condition.

Furthermore, the theme information box 1104 may include a menu item for adjusting the strengths of the plurality of input emotion-expressing words. The recommended music list output box 1107 may include a representative emotion icon 1108 capable of indicating the emotions of pieces of recommended music included in the recommended music list.

As described above, the present invention is advantageous in that when music is searched for using information about the emotions of music, a search using mixed emotions can be performed, thus improving a user's satisfaction with the results of the search.

Further, the present invention is advantageous in that a user can conveniently and accurately input emotional conditions required to search for recommend music, thus improving the convenience of the user and the efficiency of a search process.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. These modifications, additions and substitutions should not be understood as being separate from the technical spirit and prospect of the present invention.

What is claimed is:

1. A method for searching for recommended music using emotional information of music, the method being performed by a music search apparatus capable of searching for recommended music using the emotional information of music, the method comprising:

inputting a search condition that is used to search for recommended music; searching a music emotion database (DB), which stores information about emotional values including valence values and arousal values of respective pieces of music, for emotional value information corresponding to the input search condition;

retrieving the emotional value information from the input search condition, the emotional value information including a valence value and an arousal value;

extracting a combination of emotion ranks corresponding to the retrieved emotional value information by using an emotion model that includes information about mixed emotions corresponding to valence values and arousal values;

searching the music emotion DB for music information corresponding to the extracted emotion ranks combination; and outputting a recommended music list including music information that corresponds to the extracted emotion ranks combination.

2. The method of claim 1, wherein outputting the recommended music list comprises:
- extracting a probability value condition corresponding to the emotional value information using the emotion model;
- searching the music information corresponding to the emotion ranks combination for music information satisfying the extracted probability value condition; and
- outputting a recommended music list including the music information satisfying the extracted probability value condition.

3. The method of claim 1, further comprising:
- configuring a two-dimensional (2D) plane having valence values and arousal values as values of respective axes, based on the emotional value information stored in the music emotion DB; and
- searching for music information falling within a range corresponding to a preset distance and a preset angle around predetermined coordinates corresponding to the input emotional value information in the configured 2D plane.

4. The method of claim 1, wherein extracting emotional value information from the input search condition includes extracting an emotion rank combination of emotions contained in an emotional keyword when the input search condition is an emotional keyword.

5. The method of claim 1, wherein inputting the search condition comprises:
- outputting a user interface that includes a music play information box including a title information item of music currently being played, a search information input box, and a recommended music list output box; and
- when the title information item is input to the search information input box in the output user interface, recognizing that music information about the music currently being played has been input as the search condition.

6. The method of claim 1, wherein inputting the search condition comprises:
- outputting a user interface that includes an emotional value selection box, implemented as a 2D plane that has valence values and arousal values as values of respective axes and that is divided into cells constituting a grid of a predetermined size, and a recommended music list output box;
- receiving a selection signal corresponding to any one of the cells constituting the grid; and
- recognizing that a valence value and an arousal value of the cell corresponding to the received selection signal have been input as the emotional value information.

7. The method of claim 6, wherein outputting the user interface comprises:
- searching the music emotion DB for a number of pieces of music corresponding to valence values and arousal values corresponding to locations of respective cells constituting the grid of the predetermined size, and outputting the respective cells in different colors depending on a number of pieces of music retrieved during the search.

8. The method of claim 1, wherein inputting the search condition comprises:
- outputting a user interface that includes an emotion list output box having a plurality of emotion-expressing words, a search information input box, and a recommended music list output box; and
- when a predetermined emotion-expressing word included in the emotion list output box is input, recognizing that an emotional keyword containing the predetermined emotion-expressing word has been input as the search condition.

9. The method of claim 8, wherein recognizing that an emotional keyword containing the predetermined emotion-expressing word has been input as the search condition comprises:
- when a plurality of emotion-expressing words, among the emotion-expressing words included in the emotion list output box, are input, generating theme information including the plurality of emotion-expressing words, and outputting a theme information window including the theme information; and
- recognizing that an emotional keyword containing the plurality of emotion-expressing words has been input as the search condition.

10. A computer-readable storage medium whose contents, when executed by a computing system, cause the computing system perform operations of searching for recommended music using emotional information of music, the operations comprising:
- inputting a search condition that is used to search for recommended music;
- searching a music emotion database (DB), which stores information about emotional values including valence values and arousal values of respective pieces of music, for emotional value information corresponding to the input search condition;
- retrieving the emotional value information from the input search condition, the emotional value information including a valence value and an arousal value;
- extracting a combination of emotion ranks corresponding to the retrieved emotional value information by using an emotion model that includes information about mixed emotions corresponding to valence values and arousal values;
- searching the music emotion DB for music information corresponding to the extracted emotion ranks combination; and
- outputting a recommended music list including music information that corresponds to the extracted emotion ranks combination.

11. The computer-readable storage medium of claim 10, wherein-outputting the recommended music list comprises:
- extracting a probability value condition corresponding to the emotional value information using the emotion model;
- searching the music information corresponding to the emotion ranks combination for music information satisfying the extracted probability value condition; and
- outputting a recommended music list including the music information satisfying the extracted probability value condition.

12. The computer-readable storage medium of claim 10, further comprising:
- configuring a two-dimensional (2D) plane having valence values and arousal values as values of respective axes, based on the emotional value information stored in the music emotion DB; and
- searching for music information falling within a range corresponding to a preset distance and a preset angle around predetermined coordinates corresponding to the input emotional value information in the configured 2D plane.

13. The computer-readable storage medium of claim 10, wherein extracting emotional value information from the input search condition includes extracting an emotion rank combination of emotions contained in an emotional keyword when the input search condition is an emotional keyword.

14. The computer-readable storage medium of claim 10, wherein inputting the search condition comprises:
   outputting a user interface that includes a music play information box including a title information item of music currently being played, a search information input box, and a recommended music list output box; and
   when the title information item is input to the search information input box in the output user interface, recognizing that music information about the music currently being played has been input as the search condition.

15. The computer-readable storage medium of claim 10, wherein inputting the search condition comprises:
   outputting a user interface that includes an emotional value selection box, implemented as a 2D plane that has valence values and arousal values as values of respective axes and that is divided into cells constituting a grid of a predetermined size, and a recommended music list output box;
   receiving a selection signal corresponding to any one of the cells constituting the grid; and
   recognizing that a valence value and an arousal value of the cell corresponding to the received selection signal have been input as the emotional value information.

16. The computer-readable storage medium of claim 10, wherein outputting the user interface comprises:
   searching the music emotion DB for a number of pieces of music corresponding to valence values and arousal values corresponding to locations of respective cells constituting the grid of the predetermined size, and outputting the respective cells in different colors depending on a number of pieces of music retrieved during the search.

17. The computer-readable storage medium of claim 10, wherein inputting the search condition comprises:
   outputting a user interface that includes an emotion list output box having a plurality of emotion-expressing words, a search information input box, and a recommended music list output box; and
   when a predetermined emotion-expressing word included in the emotion list output box is input, recognizing that an emotional keyword containing the predetermined emotion-expressing word has been input as the search condition.

18. The computer-readable storage medium of claim 10, wherein recognizing that an emotional keyword containing the predetermined emotion-expressing word has been input as the search condition comprises:
   when a plurality of emotion-expressing words, among the emotion-expressing words included in the emotion list output box, are input, generating theme information including the plurality of emotion-expressing words, and outputting a theme information window including the theme information; and
   recognizing that an emotional keyword containing the plurality of emotion-expressing words has been input as the search condition.

* * * * *